Dec. 19, 1967  S. M. DAVE  3,359,042
CONTROL MECHANISM
Filed Oct. 22, 1965  2 Sheets-Sheet 1

INVENTOR.
SHARAD M. DAVE
BY
Hoffmann and Jount
ATTORNEYS

Dec. 19, 1967     S. M. DAVE     3,359,042
CONTROL MECHANISM

Filed Oct. 22, 1965     2 Sheets-Sheet 2

*INVENTOR.*
SHARAD M. DAVE
BY
*Hoffmann and Yount*
ATTORNEYS

United States Patent Office 3,359,042
Patented Dec. 19, 1967

3,359,042
CONTROL MECHANISM
Sharad M. Dave, Detroit, Mich., assignor to Eaton Yale & Towne Inc., a corporation of Ohio
Filed Oct. 22, 1965, Ser. No. 501,265
9 Claims. (Cl. 303—21)

The present invention relates to a control mechanism operable to compare the linear velocity of a vehicle with the angular velocity of certain wheels of the vehicle, and particularly relates to such a control mechanism for use in controlling the brakes of the vehicle so as to relieve the braking force when the angular velocity of certain wheels of the vehicle reduces but the linear velocity of the vehicle is not correspondingly reduced, as when the vehicle skids upon the application of the brakes of the vehicle.

The principal object of the present invention is to provide a new and improved vehicle control mechanism which is simple in construction, highly reliable in operation and operable to compare the angular velocity of certain wheels of the vehicle with the linear velocity of the vehicle and which incorporates a member rotatable at all times at an angular velocity proportional to the linear velocity of the vehicle.

A further object of the present invention is the provision of a new and improved control mechanism, particularly for use in controlling the braking force applied to certain wheels of a vehicle, and which is operable to compare the angular velocity of a shaft member driven at an angular velocity proportional to the angular velocity of the wheels with the angular velocity of a flywheel rotated at a speed proportional to the linear velocity of the vehicle and to provide a control signal when these angular velocities differ by a predetermined amount.

A still further object of the present invention is the provision of a new and improved control mechanism, as noted in the next preceding object, wherein friction means is provided for reducing the angular velocity of the flywheel in proportion to the linear deceleration of the vehicle so that the flywheel may be termed a vehicle deceleration sensing flywheel.

Still another object of the present invention is the provision of a new and improved control mechanism, particularly useful in a brake control system for relieving the pressure in hydraulic brake lines, and which includes a rotatable member driven at an angular velocity proportional to the angular velocity of certain vehicle wheels and a flywheel rotated at an angular velocity proportional to the linear velocity of the vehicle and wherein the velocities of the rotatable member and flywheel during a normal non-skidding stop are such that they reach zero at substantially the same time and with the loss in kinetic energy of the flywheel being proportional to the linear deceleration of the vehicle.

Still another object of the present invention is the provision of a new and improved control mechanism, as noted in the next preceding object, wherein the drive member and flywheel have a releasable or disconnectable driving connection therebetween and which releases in response to the flywheel having an angular velocity in excess of the angular velocity of the rotatable member and when released produces a control signal.

A still further object of the present invention is the provision of a new and improved control mechanism having a rotatable member driven at a speed in proportion to the angular velocity of certain wheels of the vehicle, and a drive connection between the rotatable member and a flywheel and wherein the drive connection includes a disconnectable clutch mechanism which disconnects upon rotation of the flywheel relative to the rotatable member and automatically causes a camming of a portion of the drive connection away from the flywheel to break the drive between the flywheel and rotatable member and causes a control signal to be produced.

A still further object of the present invention is the provision of a new and improved control mechanism, particularly useful in controlling the braking force applied to certain wheels of a vehicle, and which includes a vehicle deceleration sensing flywheel which is normally dirven at the average speed of rotation of the rear wheels of the vehicle through a drive connection, and wherein the drive connection permits movement of the flywheel into engagement with a friction pad means which functions to slow the rotation of the flywheel when the average speed of the rear wheels of the vehicle reduces and the linear velocity of the vehicle proportionately reduces so that when the automotive vehicle is brought to a stop, the flywheel and rotatable member stop rotating at substantially the same time.

A further object of the present invention is the provision of a new and improved control mechanism particularly useful in a brake control system for relieving the pressure in the hydraulic brake lines of an automotive vehicle, and which includes a mechanism for producing a control signal when the linear velocity of the vehicle is not correspondingly reduced when the angular velocity of certain wheels of the vehicle are reduced, as when the brakes of the vehicle are applied and the vehicle skids, and wherein the mechanism is rendered inoperative to relieve the braking pressure when the vehicle is moved in a reverse direction.

Further objects and advantages of the present invention will be apparent to those skilled in the art to which it relates from the following detailed description of the preferred embodiment thereof made with reference to the accompanying drawings forming a part of this specification and in which.

Figure 1:
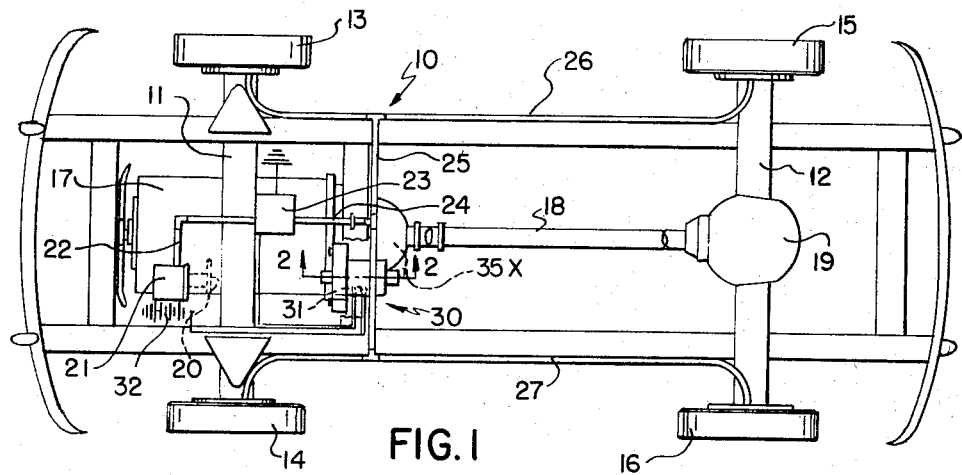
FIG. 1 is a schematic plan view of a vehicle embodying the present invention.

The present invention provides an improved control mechanism for use in an automotive vehicle for comparing the linear velocity of the vehicle with the angular speed of rotation of at least one wheel of the vehicle. The control mechanism is operable to provide a control signal when the linear velocity of the vehicle is excessive when compared with the angular speed of rotation of at least one wheel of the vehicle. The control mechanism of the present invention is particularly useful as an antiskid device used in a brake control system for controlling the braking force applied to the wheels of the vehicle. The control mechanism is operable to relieve the braking pressure applied to the brakes of the vehicle when the linear velocity of the vehicle is excessive as compared with the angular speed of rotation of certain wheels of the vehicle, which occurs when the vehicle skids upon the application of the vehicle brakes.

The present invention, as shown in the drawings, is preferably embodied in an automotive vehicle 10. The vehicle 10 includes a front axle 11 and a rear axle 12.

The front axle 11 carries a pair of ground engaging wheels 13, 14 and the rear axle 12 likewise carries a pair of ground engaging wheels 15, 16. The rear wheels 15, 16 are driven from the vehicle engine 17 through a drive shaft 18 and differential 19.

The automotive vehicle 10 includes a hydraulic brake system for applying a braking force to each of the wheels of the vehicle. The brakes, of course, are applied upon depression of a brake pedal 20 which cooperates with a master cylinder 21. The master cylinder 21 is connected by a hydraulic line 22 to a valve 23. The valve 23 is connected through a hydraulic conduit 24 to a hydraulic conduit 25. The hydraulic conduit 25 extends transversely of the vehicle and connects with hydraulic conduits 26 and 27 on opposite sides of the vehicle. The conduit 26 delivers hydraulic fluid to hydraulically actuated brakes at the wheels 13 and 15, and the hydraulic conduit 27 delivers hydraulic fluid to hydraulically actuated brakes at the wheels 14, 16. The valve 23 in the hydraulic line is a well-known solenoid operated valve which is operable to relieve hydraulic pressure in the conduits 24–27 in a manner not illustrated. The valve is of conventional construction and will not be described in detail. Reference may be made to United States Patent No. 3,165,180 for a disclosure of such a valve and its mode of operation.

The brake control system includes a control mechanism 30 for actuating operation of the valve 23 and thereby controls the braking force applied to the wheels of the vehicle. The control mechanism 30 is operable to compare the linear velocity of the vehicle with the angular speed of rotation of at least one wheel of the vehicle and in the embodiment shown in the drawings, compares the linear velocity of the vehicle with the average angular speed of the rear wheels 15, 16 of the vehicle. The control mechanism 30 is operable when the linear speed of the vehicle is excessive as compared to the average angular speed of rotation of the rear wheels 15, 16 to provide a control signal which energizes the valve 23. Specifically, under these conditions, the control mechanism 30 actuates a microswitch 31 which completes the circuit from the battery 32 of the vehicle through the switch 31 to the valve 23 to energize the valve 23. This, of course, causes the valve 23 to operate to relieve the hydraulic pressure in the lines 24–27. A mechanical arrangement for actuating the relief of the hydraulic pressure in lines 24–27, of course, could be substituted for the described circuit.

From the above, it should be apparent that the control mechanism 30 will operate to prevent or minimize skidding of the vehicle. The control mechanism so operates by comparing the linear velocity of the vehicle with the average angular speed of rotation of the rear wheels 15, 16 of the vehicle. Normally, when the average angular speed of the rear wheels 15, 16 of the vehicle decreases as when the brakes are applied, the linear velocity of the vehicle correspondingly decreases. However, in the event that the linear speed of the vehicle does not correspondingly decrease, as when the vehicle slides or skids, the control mechanism 30 is operable to actuate the switch 31 and relieve the braking pressure in the lines 24–27 by actuating the valve 23. This, of course, relieves the pressure applied to the wheels and thereby minimizes skidding of the vehicle. Thus, the control mechanism 30 does minimize skidding and enables the operator to maintain a good control over the vehicle.

Figure 2:
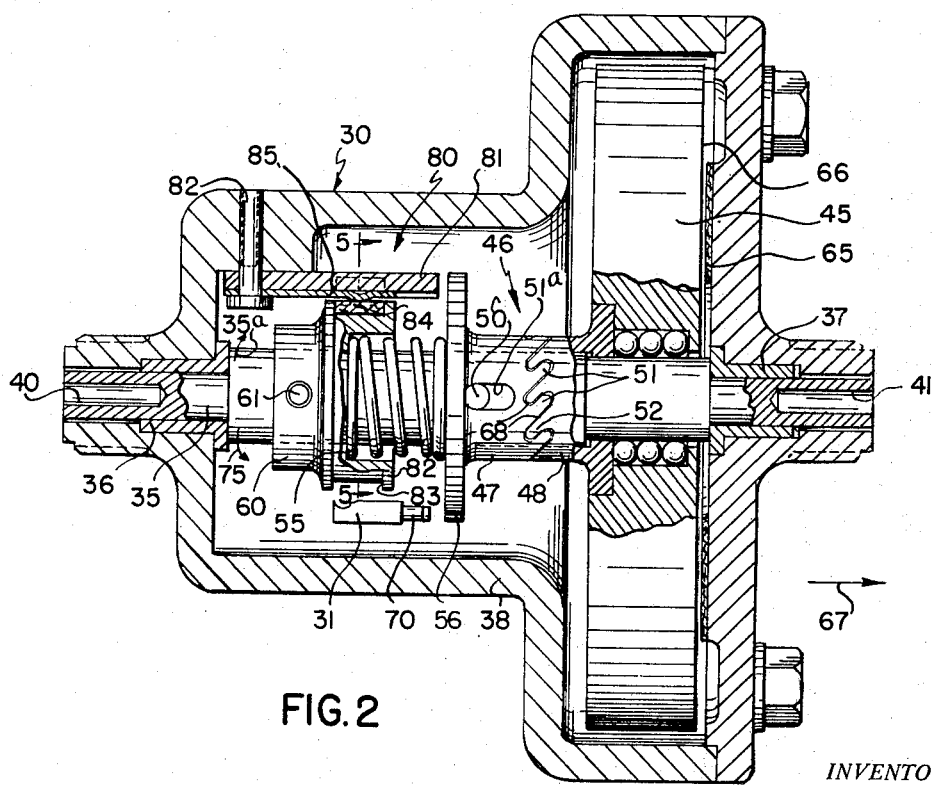
FIG. 2 is a sectional view of the control mechanism shown in FIG. 1 and taken approximately along section line 2—2 of FIG. 1.

The control mechanism 30 includes a rotatable shaft member 35 which is rotated at an angular velocity proportional to the average angular velocity of the rear wheels of the vehicle. As shown schematically in FIG. 1, the shaft member 35 is driven from the transmission of the vehicle by a suitable drive mechanism indicated by the dash line 35X. The shaft member 35 is supported at its opposite ends by bearings 36, 37 which are supported in a housing 38. As shown in FIG. 2, the left end of the shaft 35 has a socket 40 therein providing a drive connection for the speedometer cable, and the right end of the shaft member 35 likewise has a socket 41 therein for connection to the speedometer of the vehicle.

The control mechanism 30 also includes a vehicle deceleration sensing flywheel 45. The flywheel 45 is at all times rotated at an angular velocity proportional to the linear velocity of the vehicle and thus senses the linear velocity of the vehicle. The flywheel 45 is, under normal conditions, driven from the shaft 35, and it should be obvious that under normal conditions the average angular speed of the rear wheels 15, 16 of the vehicle is proportional to the linear velocity of the vehicle. The flywheel 45 is specifically driven by a disconnectable drive coupling 46 acting between the rotatable shaft member 35 and the flywheel 45. The disconnectable drive coupling 46 is in the nature of a one-way clutch and includes a clutch member 47 in the nature of a sleeve encircling the shaft 35 and driven by the shaft 35, and a clutch member 48, likewise in the form of a sleeve encircling the shaft 35, and fixedly connected with the flywheel 45 to rotate the flywheel 45 upon rotation thereof. The clutch member 47 is driven upon rotation of the shaft 35 by a pin member 50 which is fixedly connected to the shaft 35 and which extends through an elongated slot 51a in the member 47. The member 47 is slidably mounted on the shaft member 35 for movement relative thereto and relative to pin 50, the slot 51a permitting such movement.

The end of the clutch member 47 adjacent the flywheel 45 is provided with a plurality of driving fingers 51 which project toward the flywheel 45 and extend at an angle to the axis of rotation of the flywheel 45. The clutch member 48 which is fixedly connected with the flywheel 45 has a similar plurality of fingers 52 which project toward the clutch member 47 and normally intermesh with the fingers 51 on the clutch member 47. The outer tips of the intermeshed fingers 51, 52 engage clutch members 48, 47, respectively, between the fingers and transmit the drive therebetween so as to normally drive the flywheel 45 from the shaft 35.

The clutch members 47 and 48 of the disconnectable drive coupling 46 are biased into driving engagement with the fingers 51, 52 intermeshed by a spring 55. The spring 55 is a coil spring which encircles the shaft 35 and at one end thereof engages a flange portion 56 of the clutch member 47 and the other end thereof engages a collar member 60. The collar member 60 is fixed by means of a pin 61 to the shaft 35 for rotation with the shaft 35 and functions as an axially fixed abutment for the spring 55. As noted above, the spring 55 biases the clutch member 47 toward the right, as viewed in FIG. 2. The drive coupling 46 is disconnected upon movement of the clutch member 47 relative to the pin member 50 against the bias of the spring 55 and toward the left, as viewed in FIG. 2.

As noted above, the flywheel 45 is driven at all times at a speed proportional to the linear speed of the vehicle. Accordingly, upon deceleration of the vehicle, means is provided for reducing the angular velocity of the flywheel in proportion to the linear deceleration of the vehicle. The means for reducing the angular velocity of the flywheel in proportion to the linear deceleration of the vehicle comprises an arcuate friction pad 65 which is mounted on a portion of the housing 38 so as to engage a radial face 66 of the flywheel 45 when the vehicle decelerates. When the vehicle 10 decelerates, the flywheel 45 slides relative to shaft 35 toward the front end of the vehicle in the direction as indicated by the arrow 67 in FIG. 2. The amount of sliding movement is slight and has been exaggerated in the drawings for illustration purposes. When flywheel 45 shifts relative to the shaft 35 in the direction of the arrow 67, the radial surface 66 of the flywheel engages the friction pad 65. The friction pad 65 thus slows the angular speed of rotation of the flywheel 45 so that the rotation of the flywheel 45 remains proportional to the linear speed of the vehicle, even though the vehicle is decelerating. The disconnectable drive coupling 46 and specifically the intermeshed fingers 51, 52 have sufficient clearance, designated 68, therebetween so as to permit the sliding of the fingers 52 relative to the fingers 51 without disconnecting the driving connection therebetween. The construction is such that under normal non-skidding conditions the angular velocities of the shaft 35 and flywheel 45 reach zero at substantially the same time. Thus, under normal conditions, the flywheel 45 is constantly driven at a speed proportional to the linear speed of the vehicle.

Figure 3:
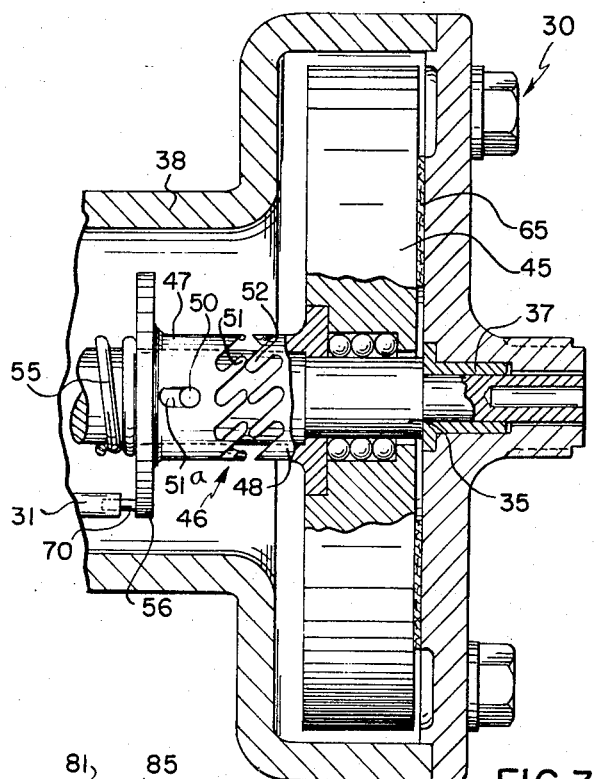
FIG. 3 is a fragmentary view of the control mechanism shown in FIG. 2 with parts in a different position.
Figure 5:
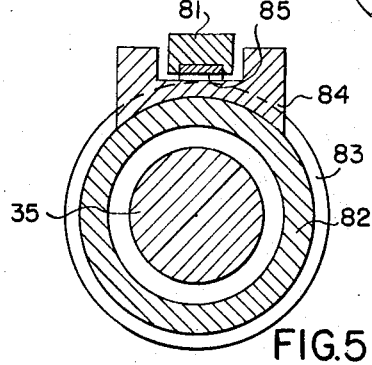
FIG. 5 is a sectional view of the control mechanism of FIG. 2 taken approximately along the section line 5—5 of FIG. 2.

In the event that the average angular speed of the rear wheels 15, 16 is decreased but the linear velocity of the vehicle is not correspondingly decreased, as when the vehicle slides, the shaft 35 decreases in angular velocity since it is driven at the average angular speed of the rear wheels 15, 16 of the vehicle. However, the flywheel 45 does not decrease in speed since the linear speed of the vehicle has not decreased. Thus, the flywheel 45 rotates relative to the shaft 35 due to the kinetic energy which has built up in the flywheel 45. The relative rotation of the flywheel 45 causes the fingers 52 fixedly connected with the flywheel 45 to rotate relative to the fingers 51 on the member 47 and due to the configuration of the fingers, the fingers 52 effect a camming of the member 47 against the bias of the spring 55 to the position shown in FIG. 3 in which the fingers 51, 52 of the cooperating coupling parts of the disconnectable coupling 46 are out of driving mesh, and the flywheel 45 is free to rotate relative to the member 47. When this occurs, the flywheel 45 may or may not be shifted forwardly in the direction of the arrow 67 to engage the friction pad 65 because this occurs when the vehicle decelerates. As shown in FIG. 3, the flywheel 45 has shifted into engagement with the friction pad 65.

When the clutch member 47 moves from the position shown in FIG. 2 to the position shown in FIG. 3, the flange portion 56 thereof engages a switch actuating member 70. When the switch actuating member 70 is engaged by the flange portion 56 of the clutch member 47 the microswitch 31 is actuated so as to energize the valve member 23 which, as noted above operates to relieve the hydraulic pressure in the lines 24-27 and releases the braking force on the vehicle wheels. This, of course, increases the angular velocity of the rear wheels 15, 16 and, in all probability, will cause the disconnectable coupling 46 to be reconnected so as to drive the flywheel 45 from the shaft 35. If the brake pressure is again applied and the rear wheels again begin slipping so that the linear velocity of the vehicle again does not decrease corresponding to the angular velocity of rotation of the shaft 35, the disconnectable coupling 46 will again be disconnected, the switch 31 will again be actuated, and the valve 23 will again be actuated to relieve the pressure in the hydraulic lines 24-27. This action will take place in a continuous manner as long as the angular velocity of the vehicle deceleration sensing flywheel exceeds the velocity of the shaft 35 sufficiently to overcome the spring 55.

The control mechanism 30 is rendered inoperative when the vehicle is moving in a rearward or reverse direction. When the vehicle moves in a reverse direction, the shaft 35 rotates in the direction indicated by the arrow 75 in FIG. 2. When the shaft 35 is rotated in the direction of the arrow 75, the clutch member 47 tends to rotate so as to move the fingers 51 out of engagement with the fingers 52, and the disconnectable coupling 46 tends to disconnect, which would cause the member 47 to move toward the left, as viewed in FIG. 2, relative to the shaft 35. This, of course, would cause actuation of the switch 31 and a reduction in the pressure of the hydraulic lines 24-27. This would render the brakes of the vehicle 10 inoperative when the vehicle was going in reverse.

Accordingly, the control mechanism 10 includes means 80 for rendering the control mechanism 30 inoperative when the vehicle is moving in a reverse direction. The mechanism 80 includes a stop member 81 which is pivotally secured by a pin 82 to the housing 38. The stop member 81 extends axially of the shaft 35 and toward the flange 56 of the clutch member 47. The stop member 81 is movable between a position designated A and a position designated B in FIG. 4. The stop member 81 is in position A when the vehicle is moved in a forward direction and has no function. When the stop member 81 is in the position B the stop member 81 projects in close proximity to the flange portion 56 of the clutch member 47. Thus, when the clutch member 47 tends to move rearwardly, it engages the outer end of the stop member 81 before it engages the switch actuating member 70. This can be seen from FIG. 2 wherein, for illustration purposes, the stop member 81 is shown in its position when the vehicle is moving in reverse. Thus, the stop member 81 prevents movement of the clutch member 47 so that the switch member 32 is not actuated thereby during reverse movement of the vehicle.

Figure 4:
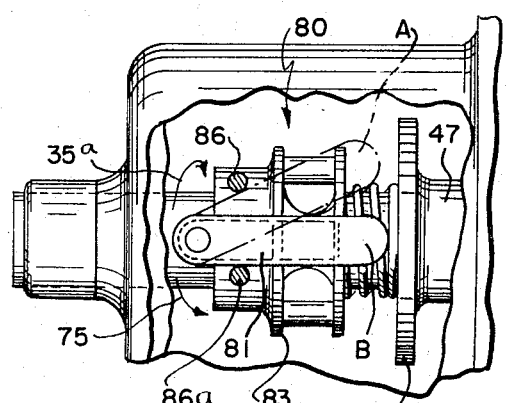
FIG. 4 is a fragmentary top plan view of the control mechanism shown in FIG. 2, with portions broken away.
Figure 6:
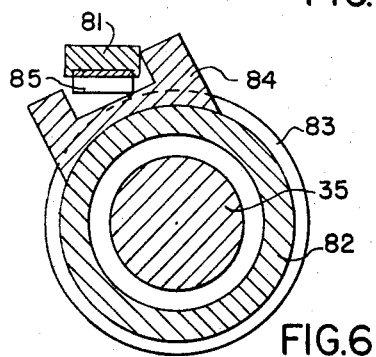
FIG. 6 is a view similar to that of FIG. 5 but with parts in a different position.

The stop member 81 is moved between its positions A and B in FIG. 4 in response to rotation of the shaft member 35 and, more specifically, in response to rotation of the collar member 60 with the shaft member 35. The collar member 60 includes a sleeve portion 82 which has an outer peripheral channel 83 located therein and which extends circumferentially of the sleeve portion 82. The stop member 81 cooperates with a friction pad 84 which is located in the channel 83. The stop member 81 projects through a slot in the friction pad 84. The friction pad 84 is biased into the channel by a leaf spring 85 carried by the stop member 81. The frictional engagement between the frictional pad 84 and the channel 83 is sufficient to cause the stop member 81 to be moved with the collar member 60 upon rotation of the collar member 60.

When the shaft 35 is moved in the direction of the arrow 35a, as when the vehicle is moved in a forward direction, the friction pad 84 and the stop member 81 are moved to the position designated A in FIG. 4, and a stop pin 86 carried by the housing 38 engages the edge of the stop member 81 and limits further movement of the stop member 81. When the shaft 35 is rotated in the reverse direction, as indicated by the arrow 75, the friction pad 84 cooperates with the collar 60 to drive the stop member 81 from the position designated A to the position designated B in FIG. 4. The stop pin 86a engages the edge of the stop member 81 and limits further movement thereof beyond its position B.

From the above description, it should be apparent that applicant has provided a new and improved control mechanism which is operable to produce a control signal when the linear velocity of the vehicle is excessive as compared to the average angular velocity of the rear wheels 15, 16 of the vehicle. Moreover, it should be noted that the control mechanism operates to compare the angular velocity of a vehicle decelerator sensing flywheel with the angular velocity of a member rotated in proportion to the average speed of the rear wheels of the vehicle. Furthermore, it should be apparent that the control mechanism is not effective during reverse operation of the vehicle.

It should be further understood that applicant has made a detailed description of an embodiment of the present invention hereinabove and that certain modifications, changes, and adaptations may be made therein by those skilled in the art to which it relates and it is intended to cover all such modifications, changes, and adaptations which come within the scope of the appended claims.

Having described my invention, I claim:

1. A control mechanism comprising a rotatable shaft member rotatable in response to a first condition, a flywheel supported for axial shifting movement in response to a second condition, a drive connection for transmitting rotary movement of the shaft member to said flywheel, said drive connection being a one-way clutch and including a first clutch member fixedly connected with said flywheel and a second clutch member axially slidable relative to said shaft member and driven thereby, said clutch members having a plurality of projecting interdigitated drive elements which are cooperable to drive said flywheel in one direction, and to move said second clutch member axially when said flywheel rotates relative to said shaft member, spring means biasing said second clutch member axially into driving engagement with said first clutch member, and switch means actuated in response to axial movement of said second clutch member to produce a control signal.

2. A control mechanism as defined in claim 1 further including means for reducing the angular velocity of said flywheel in response to its axial shifting movement, and said projecting drive elements are cooperable to maintain the driving connection therebetween when said flywheel shifts.

3. A control mechanism as defined in claim 1 further including a stop member movable to prevent movement of said second clutch member sufficiently to actuate said switch means in one direction of rotation of said shaft member.

4. A control mechanism for comparing the linear velocity of a vehicle with the angular velocity of rotation of ground engaging wheel means of the vehicle and comprising a rotatable member driven at an angular velocity proportional to the angular velocity of the wheel means, a vehicle deceleration sensing flywheel, a disconnnectable drive connection between said flywheel and said rotatable member and disconnected when the flywheel angular velocity exceeds the angular velocity of said rotatable member, means for reducing the angular velocity of said flywheel in proportion to the linear deceleration of the vehicle, means operable to produce a control signal when said flywheel angular velocity exceeds the angular velocity of the rotatable member whereby a control signal is produced upon a decrease in the angular velocity of the wheel means without a corresponding decrease in the linear velocity of the vehicle and a decrease in the angular velocity in the wheel means with a corresponding decrease in the linear velocity of the vehicle results in a deceleration of the flywheel, said disconnectable drive connection comprising a first clutch member carried by said flywheel and a second clutch member connected for rotation and axial movement relative to said rotatable member, said first and second clutch members having interengaging means operable to effect axial movement of said second clutch member relative to said first clutch member when said first clutch member rotates relative to said second member, means biasing said clutch members into driving engagement, said means for reducing the angular velocity of said flywheel being operable to cause the angular velocity of the flywheel to become zero at substantially the same time as the angular velocity of said rotatable member becomes zero and comprising a friction pad means, said flywheel being supported for axial sliding movement upon deceleration of the vehicle, and said interengaging means comprises a plurality of interdigitated fingers projecting from said first and second clutch members, respectively, said interdigitated fingers having sufficient clearance therebetween so as to permit axial sliding of the flywheel into engagement with said friction pad means without disconnecting the drive connection between the flywheel and the drive member.

5 A control mechanism for comparing the linear velocity of a vehicle with the angular velocity of rotation of ground engaging wheel means of the vehicle and comprising a rotatable member driven at an angular velocity proportional to the angular velocity of the wheel means, a vehicle deceleration sensing flywheel, a disconnectable drive connection between said flywheel and said rotatable member and disconnected when the flywheel angular velocity exceeds the angular velocity of said rotatable member, means for reducing the angular velocity of said flywheel in proportion to the linear deceleration of the vehicle, means operable to produce a control signal when said flywheel angular velocity exceeds the angular velocity of the rotatable member whereby a control signal is produced upon a decrease in the angular velocity of the wheel means without a corresponding decrease in the linear velocity of the vehicle and a decrease in the angular velocity in the wheel means with a corresponding decrease in the linear velocity of the vehicle results in a deceleration of the flywheel, said means for reducing the angular velocity of said flywheel comprising friction pad means fixed with respect to said flywheel, and said flywheel being supported for movement upon deceleration of the vehicle so that a portion of said flywheel engages said friction pad means with a pressure engagement in response to deceleration of the vehicle.

6. A control mechanism for comparing the linear velocity of a vehicle with the angular velocity of rotation of ground engaging wheel means of the vehicle and comprising a rotatable member driven at an angular velocity proportional to the angular velocity of the wheel means, a vehicle deceleration sensing flywheel, a disconnectable drive connection between said flywheel and said rotatable member and disconnected when the flywheel angular velocity exceeds the angular velocity of said rotatable member, means for reducing the angular velocity of said flywheel in proportion to the linear deceleration of the vehicle, a control switch, means operable to actuate said control switch to produce a control signal when said flywheel angular velocity exceeds the angular velocity of the rotatable member whereby a control signal is produced upon a decrease in the angular velocity of the wheel means without a corresponding decrease in the linear velocity of the vehicle and a decrease in the angular velocity in the wheel means with a corresponding decrease in the linear velocity of the vehicle results in a deceleration of the flywheel, means for preventing a control signal from being produced when the vehicle is moving in a reverse direction and comprising a stop member movable to a first position to prevent actuation of said control switch in response to rotation of said rotatable member in a first direction and movable to a second position allowing for actuation of said control switch in response to rotation of said rotatable member in a second direction.

7. A control mechanism for controlling the pressure applied to hydraulically actuated brakes of a vehicle comprising a rotatable member driven at an angular velocity proportional to the average angular velocity of the rear wheels of the vehicle, a vehicle deceleration sensing flywheel, a disconnectable drive connection between said flywheel and said rotatable member disconnected when said flywheel angular velocity exceeds the angular velocity of said rotatable member, means for reducing the angular velocity of said flywheel in proportion to the linear deceleration of the vehicle, means operable to produce a control signal when said flywheel velocity exceeds the velocity of the rotatable member, means for relieving the hydraulic pressure in the vehicle brakes in response to receipt of said control signal, said disconnectable drive connection comprising a one-way clutch and including a pair of clutch members encircling said rotatable member, one of said clutch members drivingly connected to said flywheel and the other of said clutch members drivingly connected to said rotatable member and slidable relative thereto and moved axially thereof in response to rotation of said flywheel relative to said rotatable member, said means operable to produce said control signal comprising switch means actuated upon movement of said other clutch member, said clutch members having a plurality of interengaging drive projections, said flywheel being supported for axial movement in response to deceleration of said vehicle, and said drive projections being associated so as to permit the axial movement of the flywheel and yet maintain the drive connection therebetween.

8. A control mechanism for controlling the pressure applied to fluid actuated brakes of a vehicle comprising a rotatable member driven at an angular velocity proportional to the angular velocity of at least one wheel of the vehicle, a vehicle deceleration sensing flywheel, means including a disconnectable drive connection between said flywheeel and said rotatable member and disconnected when said flywheel angular velocity exceeds the angular velocity of said rotatable member, said means operable to produce a control signal when said flywheel velocity exceeds the velocity of the rotatable member, means for relieving the fluid pressure in the vehicle brakes in response to receipt of said control signal, and means for preventing said control signal from being produced when the vehicle is moving in a reverse direction including a stop member movable between a first position in which it prevents actuation of said control signal and a second position in which it allows for actuation of said control signal, and wherein said control signal is produced by actuation of a control switch and said means for producing said control signal comprises a part movable to actuate said switch when said flywheel velocity exceeds the velocity of said rotatable member, and said stop member in its first position blocks movement of said part.

9. A control mechanism for comparing the linear velocity of a vehicle with the angular velocity of at least one wheel of the vehicle which during braking decelerates and accelerates, said control mechanism being adapted to be mounted on the vehicle and comprising a first rotatable member, means for effecting rotation of said first rotatable member at an angular velocity proportional to the angular velocity of the one wheel of the vehicle, a rotatable flywheel member, disconnectable drive means for effecting rotation of said rotatable flywheel member, means supporting said flywheel member for axial movement when the flywheel angular velocity exceeds the angular velocity of said rotatable member, means for reducing the angular velocity of said flywheel upon axial movement thereof in proportion to the linear velocity of the vehicle, and said disconnectable drive means including a member movable in response to a predetermined difference between said angular velocities to produce a control signal during both acceleration and deceleration of said wheel when braking.

References Cited

UNITED STATES PATENTS

| | | | |
|---|---|---|---|
| 2,012,366 | 8/1935 | Wevers | 188—181 |
| 2,068,370 | 1/1937 | Bush | 188—181 XR |
| 2,379,289 | 6/1945 | Farmer | 303—21 |
| 2,992,859 | 7/1961 | Sampietro | 303—24 |
| 3,256,046 | 6/1966 | Cripe | 303—21 |

EUGENE G. BOTZ, *Primary Examiner.*